July 7, 1970  R. L. ELLIOTT  3,518,741
METHOD OF MAKING A PISTON WITH RING GROOVE REINFORCEMENTS
Filed June 28, 1968  2 Sheets-Sheet 1
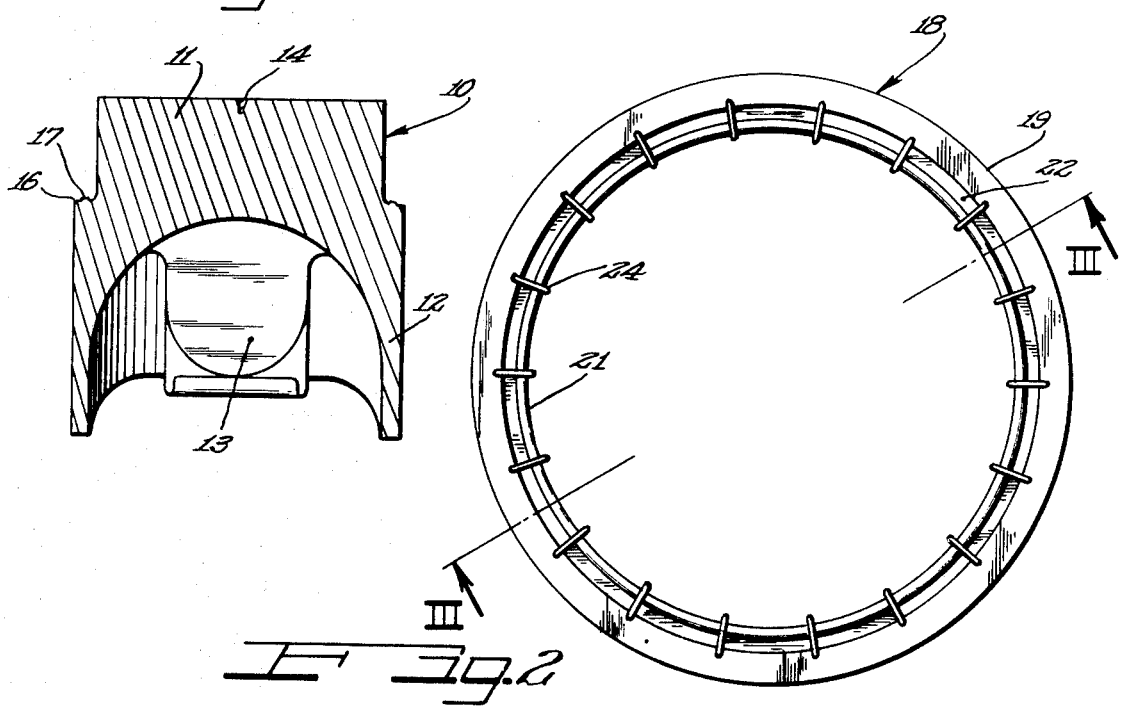
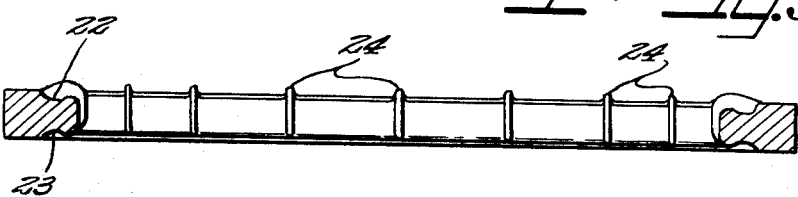
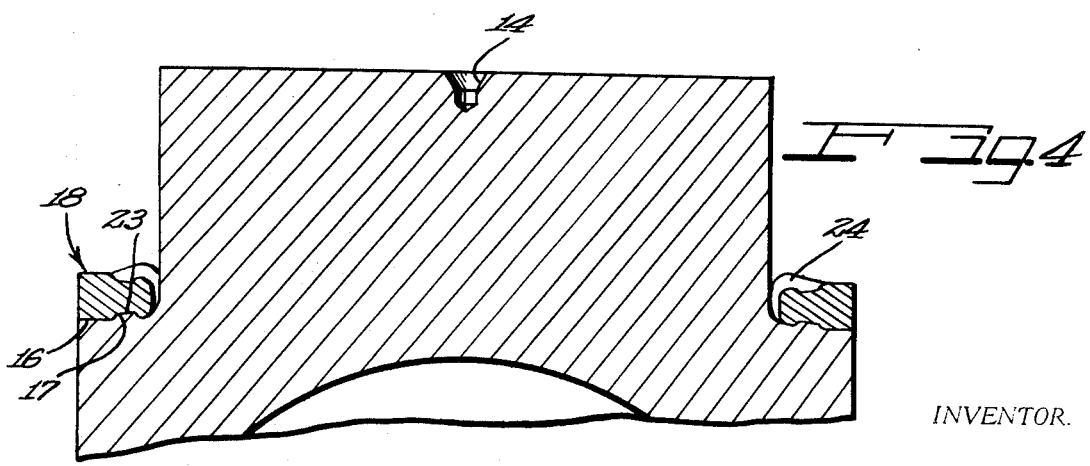
INVENTOR.
Robert L. Elliott
BY
ATTORNEYS

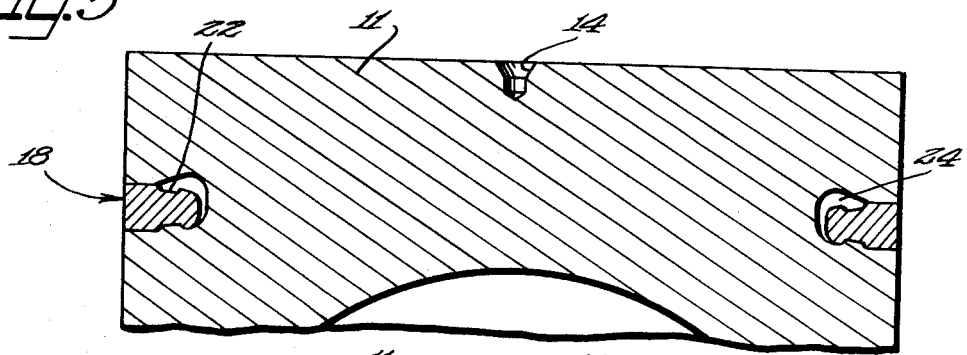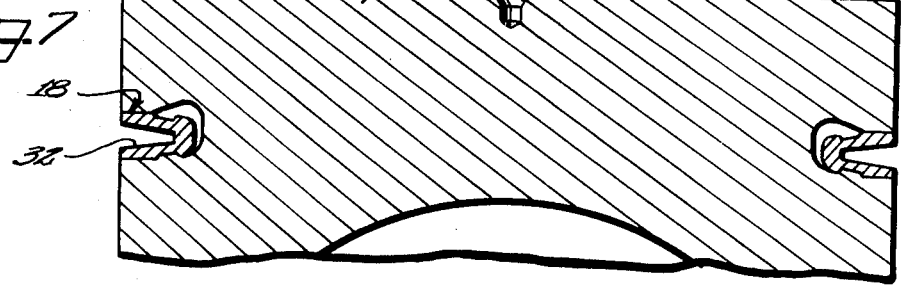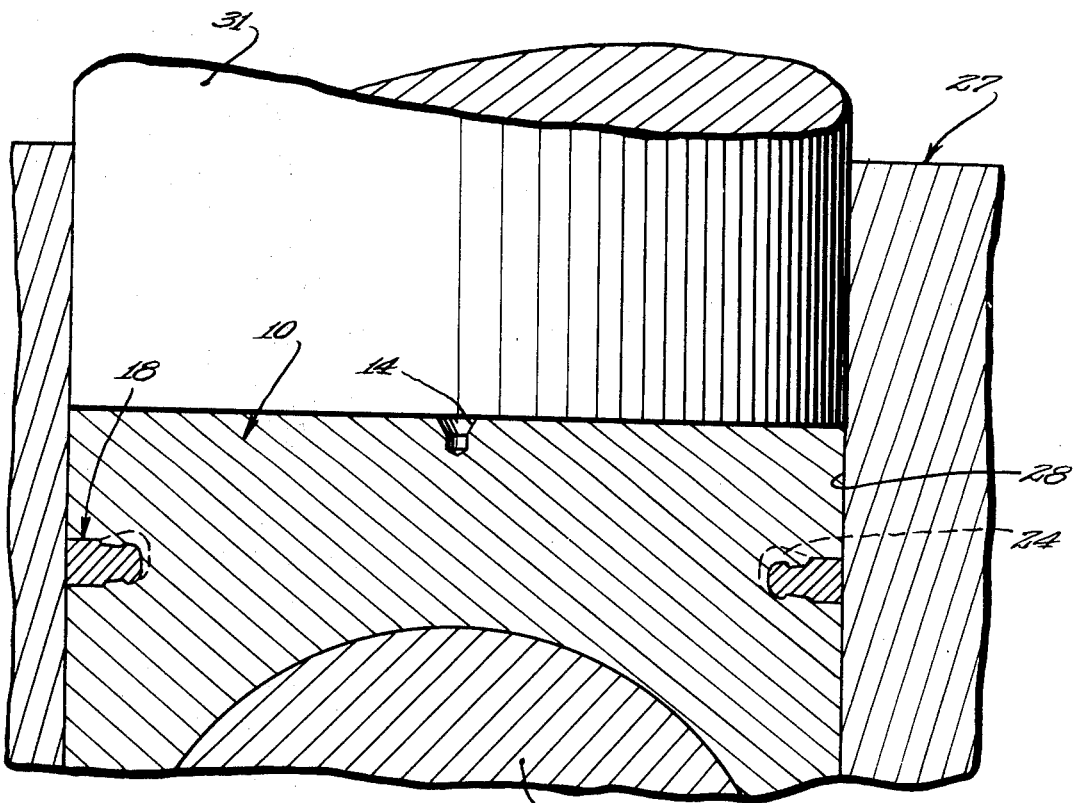

United States Patent Office 3,518,741
Patented July 7, 1970

3,518,741
METHOD OF MAKING A PISTON WITH RING GROOVE REINFORCEMENTS
Robert L. Elliott, Cleveland, Ohio, assignor to TRW Inc., Cleveland, Ohio, a corporation of Ohio
Filed June 28, 1968, Ser. No. 740,931
Int. Cl. B23p 15/10
U.S. Cl. 29—156.5                                6 Claims

ABSTRACT OF THE DISCLOSURE

Method of making an aluminum alloy piston with a ferrous metal ring insert wherein an aluminum alloy blank is upset forged about the insert ring while the two are at substantially different temperatures, and then the temperature differential between the ring and the blank is substantially decreased, whereupon the forged blank containing the insert is subjected to a final coining operation to secure the ring firmly within the blank.

CROSS REFERENCE TO RELATED APPLICATION

This application relates to an improved method of manufacturing the type of piston which is the subject of an application of Harry E. Clary, Ser. No. 552,898 filed May 25, 1966, now Pat. No. 3,430,969 and assigned to the same assignee as the present application.

BACKGROUND OF THE INVENTION

Field of the invention

This invention is in the field of forging aluminum alloy blanks such as piston bodies about ferrous metal rings which serve as reinforcement by means of sequential upset forging and coining operations which securely lock the reinforcement ring in position without the necessity of metallurgical bonding between the ferrous metal and the aluminum piston body.

DESCRIPTION OF THE PRIOR ART

In recent years, there have been some attempts to provide a strictly mechanical locking between a piston head made of aluminum and an insert ring composed of cast iron or other ferrous material. For the most part, these attempts involved the use of tabs or notches extending radially inwardly and designed to provide secure mechanical locking of the ring groove inserts to the piston alloy. Typical among these disclosures are the Daub Pat. No. 2,685,729 and the Wainwright et al. Pat. No. 2,771,328. This type of piston was generally successful in service but did not provide a continuous wear resistant surface for the piston ring. The resulting uneven wear of the sides of the groove and the piston ring rendered the piston rings less effective in sealing the combustion chamber from the crank case of the engine.

Substantially better bonding of the reinforcing ring to the piston head is accomplished by means of a metallurgical bonding process such as that described in U.S. Pat. No. 2,396,730. In thist ype of process, the ferrous ring is first dipped into molten aluminum under carefully controlled conditions after which the body of the piston is cast around the insert ring with the result that a metallurgically bonded surface occurs by virtue of alloying of the iron and aluminum at the interface. This type of process, however, is rather expensive and requires careful process control particularly in the constitution of the molten aluminum bath. Since iron is soluble in molten aluminum, the bath is quickly contaminated with excess amounts of iron and must be replaced reasonably frequently.

A substantial advance in the art of locking an insert ring in place in the head of an aluminum piston without metallurgical bonding is represented by the aforementioned Clary application, Ser. No. 552,898, now Pat. No. 3,430,-969. In this copending application, it was shown that a forged in place reinforcing ring could remain in firm contact with the aluminum if the stresses resulting from the difference in thermal expansion of the two members could be reduced to a level well below the yield strength of the aluminum at maximum operating temperatures. It was further shown that if the insert ring is provided with an area to weight ratio at least 60 square inches per pound (the area being the total area of the insert in contact with the piston alloy) the ring would remain firmly held by the head of the piston wihout the necessity of resorting to metallurgical bonding and without resorting to the use of inwardly extending interlocking lugs.

Reinforcement rings produced according to the Clary invention have been successfully tested under severe operating conditions without failure. However, some difficulty has been encountered in the process for manufacturing pistons of this type. It was found that if the reinforcement ring was heated under the same forging temperature as the aluminum piston body, the subsequent upset forging operation was likely to cause the ring to crack. Consequently, it was necessary to provide a substantial temperature differential between the aluminum alloy blank and the ferrous ring at the time of upset forging. Typically, the ring was at a temperature of 100° or less, usually from 70 to 100° F., while the aluminum alloy blank was heated to a forging temperature on the order of 700° to 950° F. At the conclusion of the upset forging operation, however, it was found that the aluminum had a tendency to contract away from the ring particularly in the area adjacent to the inner diameter of the ring.

SUMMARY OF THE INVENTION

The present invention overcomes the manufacturing difficulty heretofore encountered by combining the upset forging operation with a coining operation carried out when the insert ring and the aluminum blank are at or near thermal equilibrium conditions. The upset forging is still carried out with a substantial temperature differential, measured in hundreds of degrees, existing between the ring and the head of the piston. However, at the completion of the last stage of upset forging, the temperatures of the ring and the piston head are allowed to approach each other by heat transfer between the head and the ring until such time as there is no more than about a 100° F. temperature difference between the two. Then, the head of the piston is given a coining blow which securely locks the ring within the head of the piston. During the upset forging operation, of course the aluminum alloy has flowed about the top, bottom and inner diameter of the insert so that the insert can withstand the load imposed by the coining operation even though it is at approximately the same temperature as the aluminum alloy forging blank. Using this method, it has been found that the insert ring is rigidly held within the head of the piston and cracking of the ring during upset forging is virtually eliminated.

BRIEF DESCRIPTION OF THE DRAWINGS

FIG. 1 is a cross-sectional view of a piston blank which can be used in accordance with the present invention;

FIG. 2 is a plan view of a reinforcing ring insert used according to the present invention;

FIG. 3 is a cross-sectional view taken substantially along the line III—III of FIG. 2;

FIG. 4 is an enlarged fragmentary cross-sectional view of the piston blank and ring insert assembly with the ring insert positioned on the blank prior to the upset forging operation;

FIG. 5 is a view similar to FIG. 4 but illustrating the structure after the final upset forging operation;

FIG. 6 is a somewhat schematic view of the apparatus used in coining the forged piston and insert ring assembly; and FIG. 7 is a fragmentary cross-sectional view illustrating the configuration of the ring insert after it has been machined to provide a peripheral groove.

DESCRIPTION OF THE PREFERRED EMBODIMENTS

In FIG. 1, reference numeral 10 indicates generally a preformed piston blank composed of an aluminum alloy. The piston blank 10 has a head portion generally indicated at reference numeral 11, a skirt portion generally indicated at reference numeral 12, and thickened pin bosses 13 depending from the head inside of the skirt on diametrically opposite sides thereof. The head of the piston may be provided with a recess 14 for centering the piston blank on metal working machinery.

The head portion 11 of the piston blank is provided with an annular shoulder 16 and a continuous annular rib 17 is formed thereon for the purpose of positioning the insert ring with respect to the blank during both the upset forging and the coining operation.

A reinforcing ring 18 shown in FIGS. 2 and 3 is preferably composed of a wear resistant metal such as a high nickel cast iron of the "Ni-Resist" type. It has an outer diameter indicated at reference numeral 19 and an inner diameter indicated at reference numeral 21. To secure the maximum advantages of the reinforcing ring configuration, the ring insert 18 is preferably continuous and imperforate in that there are no holes or lugs struck out from the metal. The ring insert may, however, have an upper groove 22 formed as a continuous annulus medially of the inner and outer diameters, and a lower groove 23 similarly positioned on the under side of the ring insert 18. The dimensions of the lower groove 23 are such that the insert ring 18 can be seated over the rib 17 on the piston blank as illustrated in FIG. 4 of the drawings. The grooves 22 and 23 serve to increase the area of contact between the insert ring 18 and the piston head and thereby increase the area available for heat transfer. The groove 22 also serves to receive the metal from the piston head 11 when the piston is forged about the ring 18 to thereby help lock the insert ring relative to the piston.

The insert ring 18 also has a plurality of radially oriented ribs 24 spaced equally about the periphery between the inner and outer diameters thereof, the ribs functioning to provide some additional surface area and provide a locking with the metal of the piston head to prevent relative rotative movement. The insert ring 18 may be made somewhat oversized initially with respect to the diameter of the piston blank. This slight excess provides additional strength when the insert ring is forged in place.

With the insert ring 18 positioned as shown in FIG. 4, the assembly is upset forged in one or more stages to force the metal of the piston head 11 to flow around the inner diameter and the upper and lower surfaces of the insert ring 18 to produce the structure shown in FIG. 5. During this forging operation, the temperature of the blank is usually in the range from 700 to 950° F., while the temperature of the ring is no more than about 100° F., and usually from 70 to 100° F. As illustrated in FIG. 5, the metal of the piston blank is forced into the groove 22 and about the ribs 24.

At the completion of the upset forging operation, the aluminum alloy blank with the ferrous insert ring now secured therein is permitted to cool so that heat transfer occurs between the aluminum alloy and the ferrous metal resulting in a condition approaching thermal equilibrium between the two. For best results, the temperature differential between the ferrous metal insert ring and the aluminum alloy body should not exceed about 100° F. Then, the aluminum alloy blank while at this temperature is subjected to a coining operation either in the same die in which the upset forging was carried out or in a separate coining die as illustrated in FIG. 6 of the drawings. That figure illustrates a die 27 having a die cavity 28 in which the preformed piston blank is received, with the hollow interior of the piston assembly being received over a die insert 29. A punch 31 is arranged to reciprocate in the die cavity 28 and deliver a coining blow to the piston head 11 thereby securing the insert ring firmly within the blank. Since at the time of the coining operation, the insert ring is supported on the top, bottom and inner surfaces, it can withstand the loads imposed by the coining operation even though it is at approximately the same temperature as the aluminum alloy forging blank.

After removal of the coined blank from the coining die, the insert 18 is machined to provide a peripheral groove 32 as illustrated in FIG. 7 of the drawings. At this time, any excess metal in the insert ring 18 is also machined off to make the outer diameter of the insert ring flush with the head of the piston.

From the foregoing, it will be understood that the method of the present invention provides an improvement in the art of forging pistons to provide a piston which has improved heat transfer characteristics and which does not have to resort to metallurgical bonding in order to secure the insert ring firmly within the body of the piston.

It should be evident that various modifications can be made to the described embodiments without departing from the scope of the present invention.

I claim as my invention:

1. The method of forming a piston which comprises providing an aluminum alloy piston blank having a shoulder thereon, disposing a ferrous insert ring on said shoulder, upset forging aluminum from said blank about the ring while the blank and said ring are at substantially different temperatures, conducting sufficient heat from said blank to said ring after the upset forging so that the temperatures of said ring and said blank are within about 100° F. of each other, and thereupon coining the blank to secure the ring firmly within said blank.

2. The method of claim 1 in which at the time of upset forging the temperature of the blank is in the range from 700 to 950° F., and the temperature of the ring is no more than about 100° F.

3. The method of claim 1 in which during the upset forging, the aluminum is caused to flow along the top, bottom, and inner diameter of said insert ring.

4. The method of claim 1 in which said ring is machined after coining to provide at least one annular groove at its outer diameter.

5. The method of claim 1 in which said ring has a plurality of raised ribs on one of its surfaces for increasing the area of heat transfer between said ring and the metal of the blank.

6. The method of claim 1 in which said blank has locating means thereon for positioning said ring with respect to said blank.

References Cited

UNITED STATES PATENTS

| 2,685,729 | 8/1954 | Daub | 29—156.5 |
| 3,023,061 | 2/1962 | Daub | 277—189.5 |
| 3,118,712 | 1/1964 | Daub | 277—189.5 |
| 3,123,899 | 3/1964 | Townhill | 29—156.5 |
| 3,305,918 | 2/1967 | Christen et al. | 29—156.5 |
| 3,430,969 | 3/1969 | Clary | 277—189.5 |

JOHN F. CAMPBELL, Primary Examiner

A. D. PALMA, Assistant Examiner

U.S. Cl. X.R.

29—509; 277—189.5